United States Patent [19]

Morrison

[11] Patent Number: 4,552,088
[45] Date of Patent: Nov. 12, 1985

[54] VEHICLE GEARSHIFT INDICATOR

[76] Inventor: Thomas R. Morrison, 137 Overlook St., Mount Vernon, N.Y. 10552

[21] Appl. No.: 304,923

[22] Filed: Sep. 23, 1981

[51] Int. Cl.$^4$ ............................................. G01C 9/12
[52] U.S. Cl. ..................................... 116/28.1; 33/401; 33/366; 116/335
[58] Field of Search ...................... 33/366, 141.5, 333, 33/335, 344, 345, 346, 391, 401, 399; 116/28.1, 335, 62.3, 62.4, DIG. 20, 334

[56] References Cited

U.S. PATENT DOCUMENTS

| D. 104,124 | 10/1936 | Ward . | |
| 764,444 | 7/1904 | Finkelson . | |
| 1,257,090 | 2/1918 | Mattoon . | |
| 1,426,645 | 8/1922 | Hornbeck | 33/346 |
| 1,477,545 | 4/1922 | Day . | |
| 1,552,140 | 9/1925 | Gobatti | 33/391 |
| 1,737,936 | 9/1925 | Mercer . | |
| 2,030,068 | 2/1936 | Martin | 33/399 |
| 2,045,631 | 6/1936 | Cavender | 33/391 |
| 2,609,616 | 9/1952 | Mueller . | |
| 2,611,188 | 5/1949 | Bell . | |
| 2,624,954 | 5/1950 | Watkins . | |
| 3,059,343 | 3/1960 | Kermode . | |
| 3,372,386 | 3/1968 | Klinger . | |
| 3,378,932 | 11/1966 | Neill . | |
| 3,559,294 | 2/1971 | Bauer | 33/366 |
| 4,224,573 | 9/1980 | Brook | 33/366 |

FOREIGN PATENT DOCUMENTS

| 107775 | 6/1943 | Sweden | 33/333 |

Primary Examiner—Charles Frankfort
Assistant Examiner—Denis E. Corr
Attorney, Agent, or Firm—Thomas R. Morrison

[57] ABSTRACT

A slope-measuring device is calibrated in terms of the gear in which a multi-gear apparatus should be engaged for negotiating the slope. For example, in a multi-gear bicycle, the calibration may indicate the gear range and specific gear in a bicycle. In a motor vehicle, the slope measurement may indicate the vehicle gear which should be engaged. In order to prevent oscillation of the indication, a high viscosity fluid is employed in connection with a rotating shaft to substantially reduce the response frequency of the indication.

2 Claims, 9 Drawing Figures

PEDALLING FORCE P.F. = $R_R + R_W + R_G$
(FOR CONSTANT CADENCE)

$R_R$ = ROLLING RESISTANCE  $f$ (WEIGHT)

$R_W$ = WIND RESISTANCE  $G$ (SPEED, WIND)

$R_G$ = W.L. TAN θ  WHERE  L = DISTANCE PER UNIT TIME
                                W = WEIGHT

VEHICLE GEARSHIFT INDICATOR

BACKGROUND OF THE INVENTION

The present invention is related to slope measurement instruments and, more particularly, to slope measurement instruments for use in a multi-gear vehicle such as a bicycle, motorcycle or automobile.

Slope-measuring devices, inclinometers or gradometers are known for the measurement of the slope of a surface. Such instruments have typically been employed in vehicles or road-graders to indicate the slope of a surface on which the vehicle rests.

The rider on a multi-speed bicycle such as, for example, the common 10-ten speed bicycle, obtains the maximum performance from the bicycle when pedalling at a constant desired cadence (number of pedal strokes per minute) and with a desired pedal force. For the long distance rider who intends to pedal for many hours, it is important that the appropriate gear be chosen that provides the correct combination of bicycle speed and endurance to attain the distance objectives. Alternately, a bicycle racer or sprinter is interested in selecting the gear which provides the maximum speed over a short distance.

In both of the above situations, the selected cadence is related to the pedal pressure.

It is difficult for a bicycle rider to determine the gear which should be used for a given condition of slope and type of use.

OBJECTS AND SUMMARY OF THE INVENTION

It is an object of the present invention to provide an instrument for relating the slope and other conditions of environment and use to the gear which a bicycle or vehicle operator should use for the desired level of performance.

It is a further object of the invention to provide an apparatus for directly measuring the gear which a vehicle operator should use for achieving the desired level of performance under existing environmental and use conditions.

It is a further object of the invention to provide a measurement device for indicating the gear which a multi-gear bicycle should employ for existing conditions of use.

It is a further object of the invention to provide an indicating instrument having at least two sets of ranges corresponding to at least two environmental or use conditions.

According to an aspect of the present invention, there is provided an indicator for indicating a desired gear to be selected in a vehicle of the type having at least first and second gears comprising, means for measuring a slope on which the vehicle is disposed, and means for relating the measured slope to the one of the at least first and second gear appropriate for the measured slope.

According to a feature of the present invention, there is provided an indicator for indicating an appropriate gear to be used in a bicycle having at least first and second gears comprising a bob weight, a sector gear on the bob weight, a pinion engaged with the sector gear, a pointer, a scale adjacent the pointer, one of the pointer and the scale being affixed to the pinion and effective to assume a first position related to a second position assumed by the bob weight in response to a slope, and means on the scale for indicating the one of the at least first and second gears appropriate for the slope.

According to a further feature of the present invention, there is provided an indicator for indicating an appropriate gear to be used in a bicycle having at least first and second gears comprising a bob weight, means for producing a voltage related to an angular position of the bob weight, means for damping oscillations of the voltage due to perturbations in the bicycle, an indicator responsive to the voltage after damping, a scale associated with the indicator, and means on the scale for indicating the particular one of the at least first and second gears appropriate for the angle.

According to a further feature of the present invention, there is provided an indicator for indicating an appropriate gear to be used in a bicycle having at least first and second gears comprising a bubble level affixed to the bicycle and effective to indicate a slope on which the bicycle is disposed, a scale adjacent the bubble level, and means on the scale for indicating the one of the at least first and second gears appropriate for the slope.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
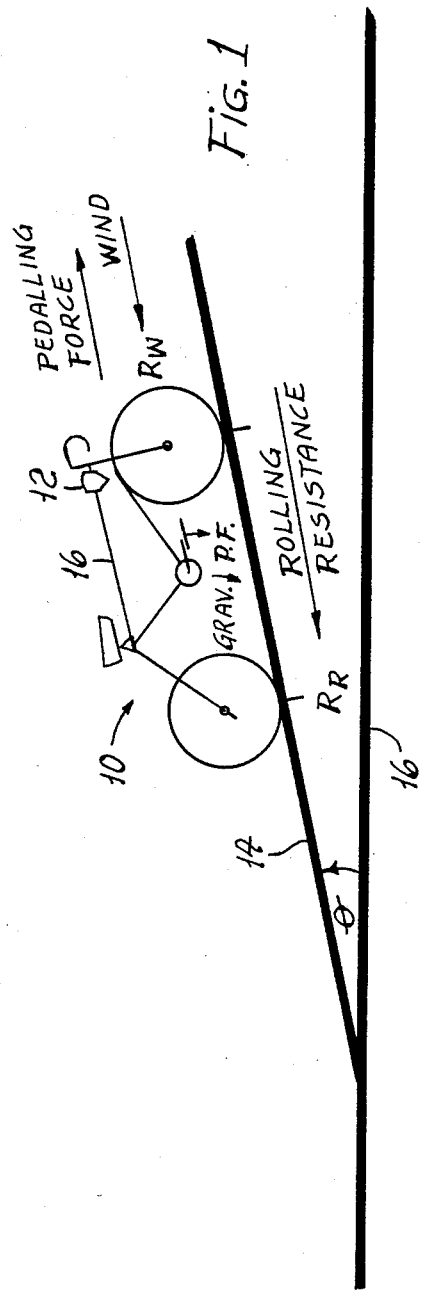
FIG. 1 is a schematic representation of a bicycle illustrating the forces acting thereon against pedalling force.

Referring now to FIG. 1, there is shown, generally at 10, a multi-speed bicycle employing a measurement device 12 according to the present invention. Bicycle 10 is shown disposed on a surface 14 which has a slope $\theta$ with respect to a horizontal line 16.

As shown in FIG. 1, the pedalling force for constant cadence is $P.F. = R_R + R_W + R_G$

| | |
|---|---|
| $R_R$ = rolling resistance | f (weight) |
| $R_W$ = wind resistance | G (speed, wind) |
| $R_G$ = W.L. tan $\theta$ where | L = distance per unit time |
| | W = weight |

For practical purposes, rolling resistance $R_R$ is a constant. Wind resistance $R_W$ is a function of bicycle speed and true wind. The component of wind due to bicycle speed is always in the retarding direction; whereas wind can be either retarding or accelerating. The resistance due to gravity $R_G$ is a function of weight, the tangent of angle $\theta$ as well as distance L which is defined as the distance travel by the bicycle per unit time. Of the quantities defined in FIG. 1 and the preceding sentences, distance L is the quantity which can be varied by shifting gears given a constant cadence.

Figure 2:
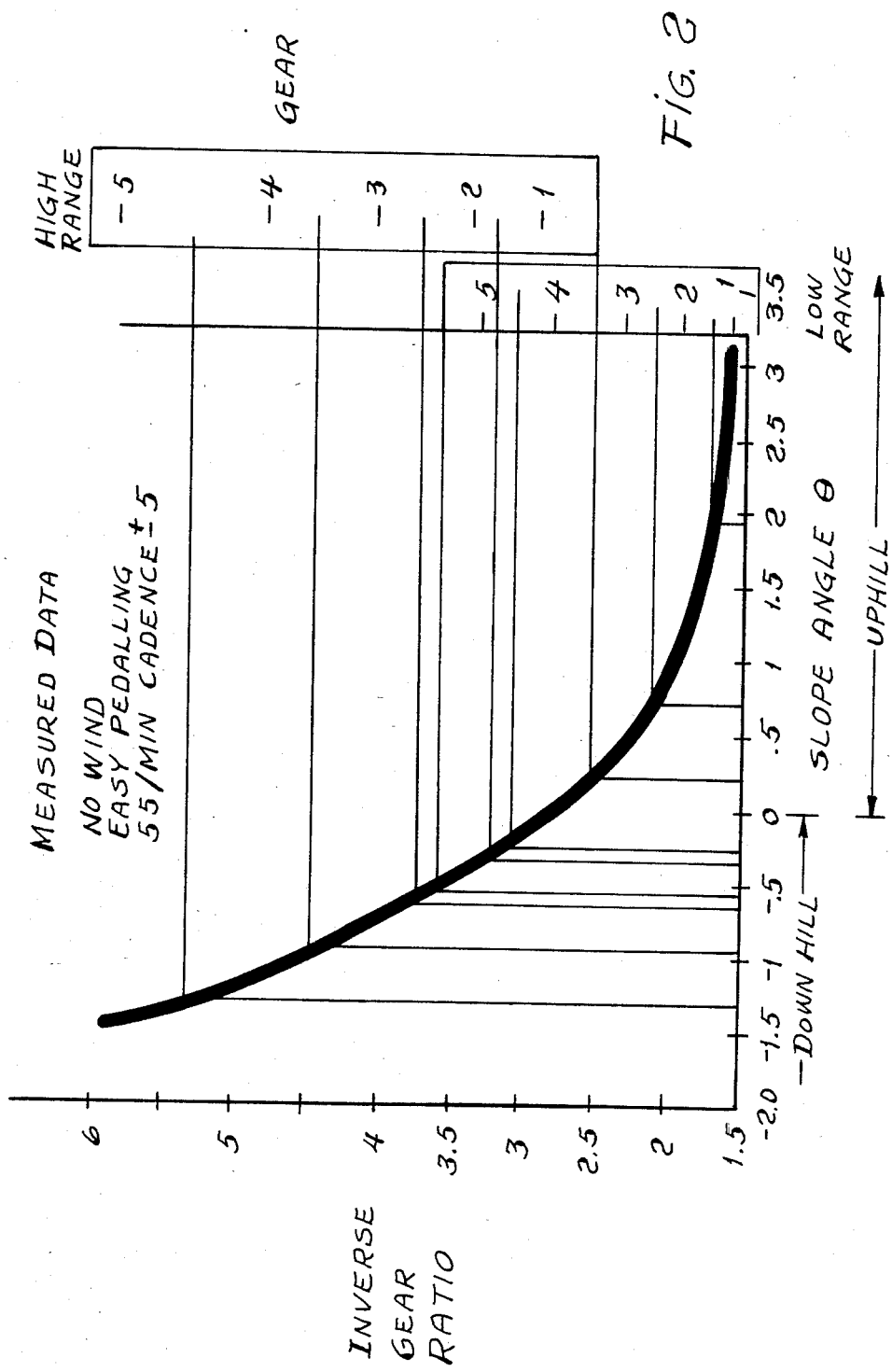
FIG. 2 is a graph to which reference will be made in describing the relationship between street slope, inverse gear ratio and gear selected during experiments using a 10-speed bicycle.

The relationships indicated in FIG. 1 were measured by pedalling a 10-speed bicycle on various slopes and recording the gears selected which permitted a cadence of about 55±5 pedal strokes per minute at a generally constant light pedal force. The measured data is summarized in FIG. 2 wherein the abscissa indicates the slope angle of the surface on which the bicycle operated and the left ordinate indicates the inverse of the gear ratio. An inverse gear ratio of 5, for example, indicates that a single rotation of the pedal crank of a bicycle yields 5 rotations of the rear wheel. The high range and low range gears are indicated adjacent the right boundary of the graph in FIG. 2. It should be noted that gear 1 (the largest rear sprocket) in the high range falls between the gears 4 and 5 (the two smallest sprockets) in the low range. Also, gear 2 in the high range has almost the same inverse gear ratio as gear 5 in the low range. This may be an artifact of the particular bicycle used. It was discovered that downhill slope angles exceeding about 1.3° cause the selection of high range gear 5. At downhill slopes approaching 2°, a cadence of 55±5 strokes per minute was insufficient to provide any further propulsion to the vehicle. At upward slopes exceeding about 1.8°, gear 1 in the low range was selected. Beyond about 3.2°, a cadence of 55±5 strokes per minute could not be maintained with the light pedal force employed. As a result, reduced or slow cadence resulted.

Figure 3:
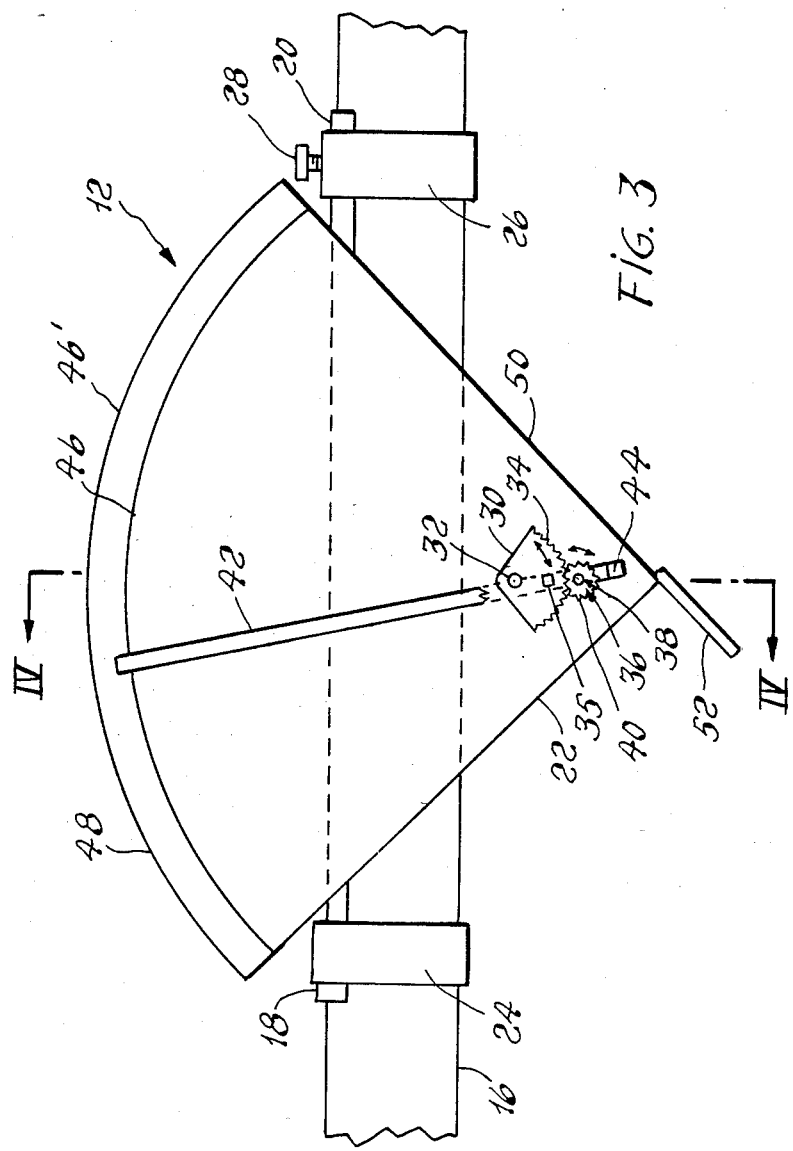
FIG. 3 is a side view of one embodiment of the invention.

Referring now to FIG. 3, there is shown a sideview of measurement device 12 wherein internal components are shown. Measurement device 12 is mounted on a bicycle crossbar 16 by any convenient means such as by first and second tabs 18 and 20 which may be affixed to a body 22 of measurement device 12 and clamped to bicycle crossbar 16 by any convenient means such as, for example, by clamps or Velcro strips 24 and 26. Tab 20 may optionally have a zero adjust screw 28 for calibrating the instrument while the bicycle rests on level ground.

A sector gear 30 is pivoted to rotate on a pivot 32. Sector gear 30 includes teeth 34 on a perimeter thereof and a weight 35 tending to urge sector gear 30 into a downward position with respect to pivot 32. A pinion 36 is pivoted on a pivot 38 with teeth 40 in engagement with teeth 34 of sector gear 30. An indicator pointer 42 having a counterweight 44 thereon is affixed to rotate with pinion 36.

Indicator pointer 42 moves adjacent a scale 46 to be more fully described hereinafter. A transparent cover 48 closes body 22 to exclude moisture and dirt while permitting indicator pointer 42 and scale 46 to be seen.

In the alternative, instead of scale 46 being disposed as shown inside transparent cover 48, a transparent scale 46' may be disposed on the surface of transparent cover 48. Transparent scale 46' may be, for example, a Decal which is applied to the surface of transparent cover 48 and which permits indicator pointer 42 to be seen therethrough. In this way, scale 46' may be selected and applied to measurement device 12 without requiring access to the interior thereof. This offers the additional advantage that, if the user should desire to change the scale to use measurement device 12 on a different vehicle from the one originally used, this can be done by removing scale 46' and applying a different scale 46' in place thereof.

As is well known, some bicycles do not have a crossbar 16, but instead, have a downward sloping forward bar. These are so called step-through bicycles previously used predominantly by women. To affix measurement device 12 to such a step-through bicycle, a sloping side 50 may be placed against the sloping bar and tab 20 may be bent to lie along the sloping bar (not shown). Velcro strip 26 may be employed in the manner previously described to secure the upper end of side 50 to the sloping bar (not shown) while an auxiliary tab 52 may be employed to secure the bottom of sloping side 50.

In operation, sector gear 30 tends to move to a position where its center of gravity, aided by weight 35, lies directly below pivot 32. Due to the greater radius of sector gear 30 than pinion 36, a relatively small angular motion of sector gear 30 results in a greatly multiplied angular motion of indicator pointer 42. As will be pointed out, the total expected angular motion of sector gear 30 is on the order of about 5½° for the total measurement range of interest. If indicator pointer 42 described a total angular motion of only 5½°, the selection of the desired one out of 10 to 18 gears would be difficult. For this reason, sector gear 30 has a greater radius and many more teeth per angular unit than does pinion 36. In the preferred embodiment, pinion 36 rotates from about 6 to about 12 times as much as sector gear 30. This is accomplished by making the radius of sector gear 30 between about 6 and 12 times the radius of pinion 36.

Figure 4:
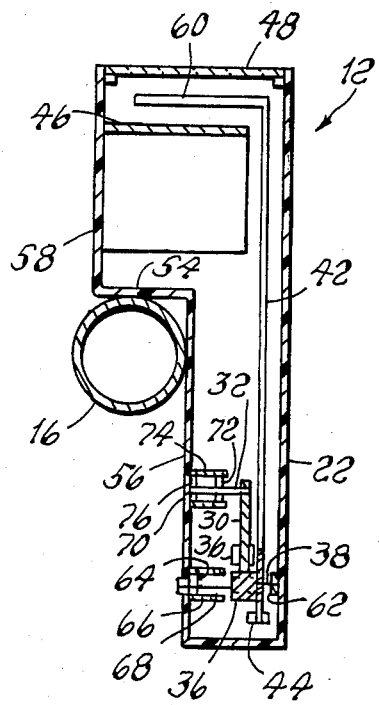
FIG. 4 is a cross section taken along IV—IV in FIG. 3.

Referring now to FIG. 4, measurement device 12 may optionally have an inward step 54 in which bicycle crossbar 16 nests for stable support. Inward step 54 provides a thin cross section lower portion 56 and a wider cross section upper portion 58. The greater width of upper portion 58 permits the use of a relatively wide scale 46. Pointer 42 optionally includes a bent outer end 60 paralleling scale 46.

Pivot 38 is seen to be rotatably supported at one end in a bearing 62 which may optionally be a jewel, brass or other material. The other end of pivot 32 is supported in a bearing 64.

Pivot 38 is affixed to, and rotates with pinion 36. A substantial portion of pivot 38 passes through a tube 66. Tube 66 and pivot 38 form an annular space therebetween which is substantially filled with a fluid 68 having a high kinematic viscosity. A kinematic viscosity is equal to the dynamic viscosity in poises divided by the density of the fluid at the same temperature. The unit of kinematic viscosity is the stoke. The kinematic viscosity of 100,000 center stokes may be obtainable and may be effective to damp out fluctuations of indicator pointer 42 due to road bumps and other vibration sources without interfering with the ability to control the position of indicator pointer 42 at rates high enough to respond to true variations in slope. For example, if the overall response if indicator pointer 42 is equal to about 0.5 Hz, substantially all of the random fluctuations due to vibration and bumps in the road as well as accelerations due to pedalling will be damped out and an average slope indication will be obtained. Fluids of greater or lesser dynamic viscosity than 100,000 center stokes may be employed to obtain the desired response. One material which has been found satisfactory for damping in such applications to fill the annular space between tube 66 and pivot 38 is dimethylpolysiloxane which is available commercially. Other suitable materials may, of course, be employed which provide an effective amount of kinematic viscosity over the environmental range anticipated for measurement device 12.

If the damping provided by fluid 68 is insufficient to obtain the desired slow response, a further gear (not shown) may be employed to rotate with pinion 36. Such further gear may be employed to drive a further pinion (not shown) at a speed several times the speed of pinion 36. An idler shaft (not shown) rotating with such further pinion may be disposed in a further tube (not shown) similar to tube 66 which may contain a fluid of high dynamic viscosity to improve the damping of the instrument.

Pivot 32 supporting sector gear 30 is cantilevered in a first bearing 70 and a second bearing 72 respectively fitted in opposite ends of a tube 74. Tube 74 may contain a fluid 76 of high dynamic viscosity for a purpose similar to the fluid 68.

Figure 5:
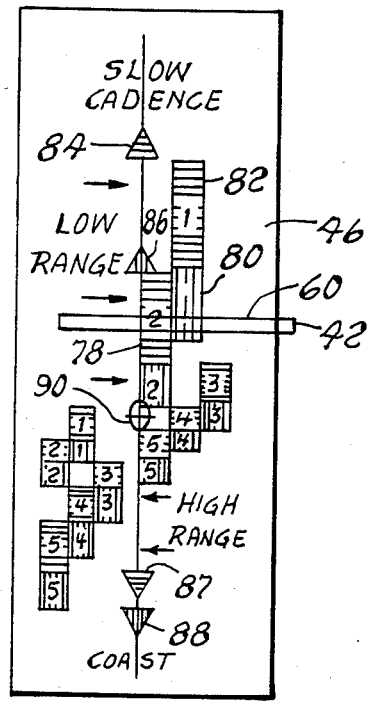
FIG. 5 is a top view of one embodiment of a scale appropriate for use with the apparatus of FIGS. 3 and 4.

Referring now to FIG. 5, one embodiment of a scale 46 is shown especially arranged for use in indicating the desired gear in a 10-speed bicycle. As is well known, a 10-speed bicycle has a low range and a high range of gearing conventionally controlled by shifting a bicycle chain between a small sprocket and a large sprocket attached to the bicycle pedal crank (not shown). In both the low range and the high range, any one of five gears, numbered from 1 to 5 may be selected by shifting the bicycle chain between a largest rear sprocket and a smallest rear sprocket respectively. That is, gear No. 1 is the largest rear sprocket and gear No. 5 is the smallest rear sprocket with gears 2–4 having intermediate sizes. In the particular 10-speed bicycle on which measurements were made to prepare scale 46, speeds 4 and 5 in the low range overlapped speeds 1 and 2 in the high range.

It will be noted that two sets of gear indications are provided in each range. One set of gear indications from 1 to 5 is horizontally lined to indicate the color blue, whereas the second set of gear indications is vertically lined to indicate the color red. The colors blue and red are arbitrarily chosen and have no particular significance other than to indicate that a visible means is provided for distinguishing the two colored scales. Under conditions of light pedalling, characteristic of cruise or long-distance cross-country travel, and/or low or following wind conditions, the horizontally lined ranges 1–5 are employed. Alternatively, if the rider is attempting a short-distance sprint at high cadence or is opposed by a head wind, the red scales indicated by vertical lining may be employed. Thus, both conditions of slope and conditions of use or environment are accounted for by the marking of scale 46.

For example, if outer end 60 of pointer 42 crosses over blue region 78 and red region 80 as shown, the bicycle gears should be adjusted for low range and, in low wind or moderate pedalling conditions gear 2, as indicated by blue region 78, should be selected. Alternatively, if a head wind or high pedalling force is employed, gear No. 1 should be selected as indicated by red region 80.

At uphill slope angles exceeding about 3° to 3.5°, a moderate pedal force in no wind, as indicated by blue region 82 indicating the use of gear No. 1, cannot maintain a uniform cadence of 55±5 strokes per minute. Beyond this angle, the cadence must slow down as indicated by blue arrow 84. Similarly, with a head wind or high force output, a slow cadence must be accepted beyond a red arrow 86.

At a downhill slope exceeding about 2° in calm wind, further pedalling makes little contribution to increasing bicycle speed and, in fact, requires such a high cadence that the cyclist is tired without gaining the benefit of speed or distance. A blue coast arrow 87 indicates the downward slope at which the cyclist should coast rather than continue to pedal. A red coast arrow 88 performs the same function in the case of head wind or more vigorous pedalling by the user.

For initial calibration, a calibration mark 90 is provided over which outer end 60 should be centered when the bicycle is on level ground. This may be accomplished by adjusting zero adjust screw 28 (FIG. 3) while the bicycle rests on level ground.

It would be clear to one skilled in the art that the indicator function of the present invention may be accomplished in alternative ways without departing from the spirit of the present invention. For example, instead of employing a mechanical indicator pointer such as shown in FIGS. 3 and 4, bubble level may be employed in conjunction with a scale similar to scale 46. A bubble may not be movable over a range of several centimeters as is conveniently done with the mechanical advantage of gearing such as in FIG. 3. However, index lines may be employed between the bubble and scale regions similar to the scale regions for high and low range and gears 1–5 of FIG. 5.

Figure 6:
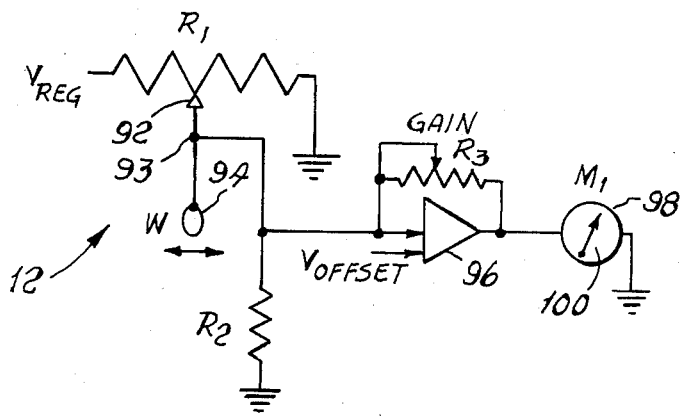
FIG. 6 is a schematic diagram of an embodiment of the invention employing electrical pickoff and damping.

A further embodiment of a measurement device 12 is shown in FIG. 6. A regulated voltage supply $V_{REG}$ is applied across a variable resistor R1 to ground. A movable contact 92 of variable resistor R1 is pivoted at a pivot 93 and is moved back and forth along variable resistor R1 under the influence of a bob weight 94. As would be clear to one skilled in the art, the voltage available at movable contact 92 varies as a function of the angle at which bob weight 94 is suspended. This voltage at movable contact 92 is applied to an input of an integrator 96 having a gain-setting variable resistor R3 between output and input thereof. The output of integrator 96 is applied to an electric meter 98 having a scale 100 calibrated in a fashion similar to scale 46 in FIG. 5. An offset voltage $V_{OFFSET}$, produced in a conventional manner not shown may be applied to integrator 96 to electrically control the zero setting of electric meter 98 while the vehicle on which measurement device 12 is mounted rests upon level ground.

Integrator 96 may be relied on to smooth out or remove high frequency components of the signal from variable resistor R1 due to the swinging of bob weight 94 under the influence of road bumps, etc. Alternatively, pivot 93 may include a shaft passing through a high viscosity fluid (not shown) in a manner similar to that described in connection with the mechanical embodiment of FIGS. 3 and 4. If such mechanical damping is employed, the integrating function of integrator 96 may be reduced or eliminated. The gain control function employing resistor R3 and offset correction employing an offset voltage $V_{OFFSET}$ may be retained by employing an operational amplifier in the position shown for integrator 96.

It would be clear to one skilled in the art that electric meter 98 and scale 100 may be replaced by a digital indicating device without parting from the scope of the present invention. That is, electric meter 98 would be replaced by an analog to a digital convertor (not shown) feeding an LED, vacuum florescent display, plasma display or other alphanumeric display device. A microprocessor or other logic device is included for relating the signal from integrator 96 to the specific indication of range and gear to be produced.

Figure 7:
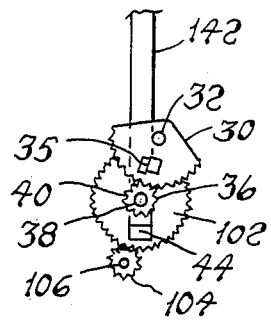
FIG. 7 is a partial schematic view generally corresponding to FIG. 3 including an additional idler gear and shaft for damping.
Figure 8:
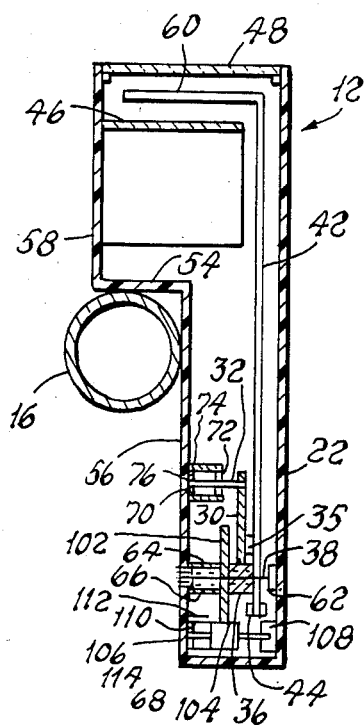
FIG. 8 is a cross section of the apparatus of FIG. 7.

Referring now to FIGS. 7 and 8, an embodiment is shown which contains additional means for damping mechanical motion of pointer 42. A large gear 102 is coupled for rotation with pinion 36. An idler pinion 104 having a much smaller radius than large gear 102 is meshed with large gear 102 and rotates on a shaft 106.

Referring now specifically to FIG. 8, shaft 106 is rotatably supported on bearings 108 and 110 and one end thereof passes through a tube 112 containing a fluid of high dynamic viscosity such as dimethlypolysiloxane.

As is well known, the drag or retarding force imposed on a surface of a moving object by a fluid of high dynamic viscosity varies with the velocity of the source. Idler shaft 106 rotates at a speed related to the speed of pointer 42 by the ratio of the radii of large gear 102 and idler pinion 104. The ratio of such radii may be from about 2 to about 40. Thus, for relatively slow rotation of pointer 42, shaft 106 attempts to rotate relatively rapidly in fluid 114. Such attempt at rapid rotation is resisted by the high dynamic viscosity of fluid 114.

To further increase the retarding torque applied to idler shaft 106, the portion of the surface of idler shaft 106 passing through tube 112 can be roughened by any convenient means such as, for example, by knurling.

Figure 9:
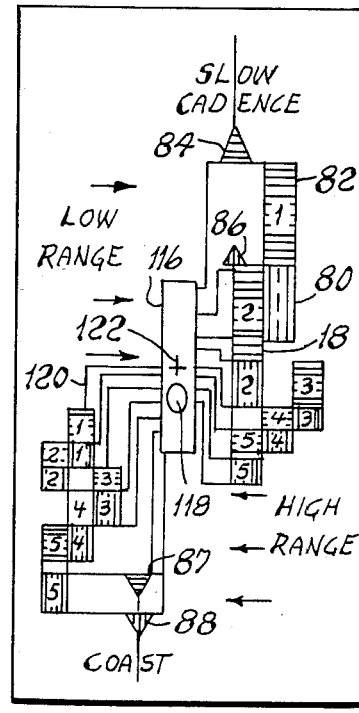
FIG. 9 is an embodiment of the invention employing a bubble level for indicating slope and relating the slope to the gear to be selected.

Referring now to FIG. 9, there is shown an embodiment of the invention employing a bubble tube 116 containing a fluid having a bubble 118 therein. As is conventional, tube 116 is downwardly concave so that bubble 118 seeks a level dependent upon the angle at which bubble tube 116 is held. The longitudinal motion of bubble 118 for a given change in angle is dependent upon the curvature of bubble tube 116. That is, as the curvature of bubble tube 116 becomes smaller (closer to being straight), bubble 118 moves further for a given angular change than if bubble tube 116 is more curved. Unfortunately, the ability to cause bubble 118 to travel in bubble tube 116 is limited by the viscosity and density of the fluid in bubble tube 116 as well as by longitudinal acceleration effects. With a very shallow curve on bubble tube 116, the restoring force which urges bubble 118 into its equilibrium position becomes very small. At some point, bubble 118 is not dependably returned to a position representative of the slope on which the vehicle rests. Thus, a hysteresis effect results. In addition, with a relatively straight bubble tube 116, longitudinal acceleration due to pedalling or braking tends to force bubble 118 toward one end or the other of bubble tube 116 irrespective of the slope on which the vehicle rests. That is, if the brakes are applied, bubble 118 is forced toward the rear (downward in FIG. 9) by the tendency of the fluid to move forward under the longitudinal deceleration of braking. Thus, bubble tube 116 cannot be as long as one would desire for clear indication of the proper gear for a given condition. In a practical system, a total bubble travel of from about $\frac{1}{4}$ to about 1 inch is obtainable without excessive effects of hysteresis or acceleration. The calibration of scale 46 can, however, be spread out in the longitudinal direction as shown and bubble position can be related to these scale calibrations by leader lines 120. In the position shown for bubble 118, for light pedalling in no or low wind, gear 3 in the high range or gear 5 in the low range may be selected.

A zero calibration mark 122 may be placed on bubble tube 116 for initial adjustment of the position of bubble 118 on level ground.

Having described specific preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An indicator for indicating an appropriate gear to be used by a rider of a bicycle having at least first and second gears, said bicycle being disposed on a surface having a slope, and said indicator comprising:
   a bob weight;
   a sector gear on said bob weight;
   a pinion engaged with said sector gear;
   a pointer;
   a scale adjacent said pointer;
   means for affixing said pointer to said pinion, said bob weight being effective to displace said pointer to a first position related to said slope; and
   first and second means on said scale for indicating which of said at least first and second gears is appropriate for said slope; and
   wherein said first indicating means includes a first set of gear indicators for indicating which of said at least first and second gears is appropriate for said rider to use under a first set of operating conditions, said first set of operating conditions including at least one of a first wind condition, a first desired cadence, and a first desired amount of force to be exerted during each stroke by said rider; and
   wherein said second indicating means includes a second set of gear indicators for indicating which of said at least first and second gears is appropriate for said rider to use under a second set of operating conditions, said second set of operating conditions including at least one of a second wind condition, a second desired cadence, and a second desired amount of force to be exerted during each stroke by said rider; whereby said rider is guided by said scale and pointer to select the one of said at least first and second gears which is appropriate both for said slope and for the one of said first and second set of operating conditions under which said bicycle is being used.

2. An indicator according to claim 1 wherein said means for affixing includes means for adjusting a relationship of said pointer and said scale, and said scale includes at least one calibration mark effective for guiding adjustment of said means for adjusting when said bicycle is disposed on a surface having a predetermined slope.

* * * * *